Jan. 16, 1951 N. E. BEVERLY 2,537,959
ARTIFICIAL TRANSMISSION LINE
Filed July 18, 1945 2 Sheets-Sheet 1

NELSON E. BEVERLY
INVENTOR

BY *Arthur J. Connolly*
ATTORNEY

Jan. 16, 1951 N. E. BEVERLY 2,537,959
ARTIFICIAL TRANSMISSION LINE
Filed July 18, 1945 2 Sheets-Sheet 2
FIG. 5
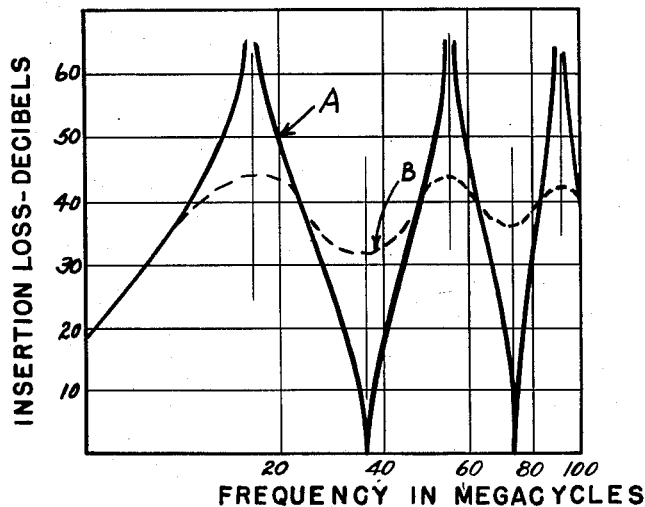
FIG. 6
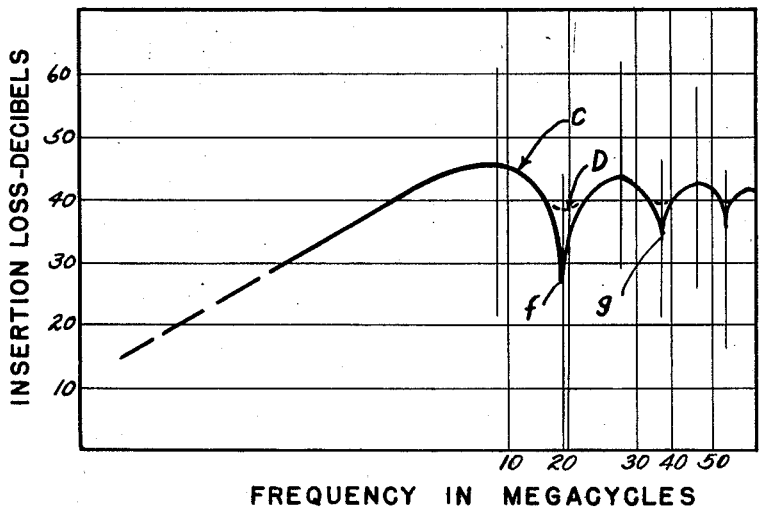
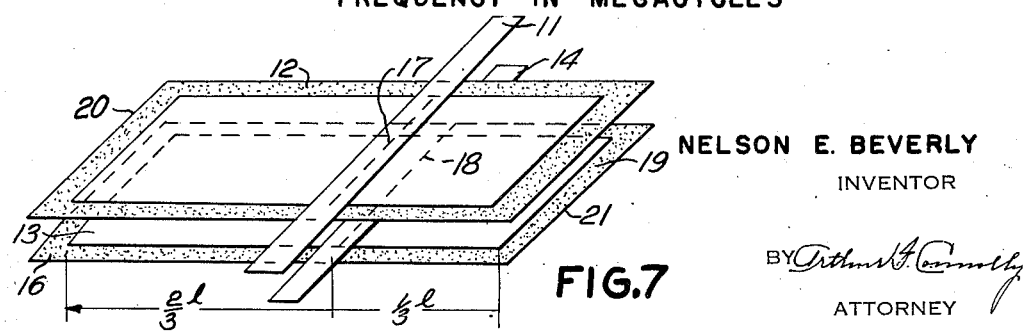
FIG. 7
NELSON E. BEVERLY
INVENTOR
BY Arthur J. Connolly
ATTORNEY Patented Jan. 16, 1951

2,537,959

UNITED STATES PATENT OFFICE 2,537,959

ARTIFICIAL TRANSMISSION LINE

Nelson E. Beverly, Williamstown, Mass., assignor to Sprague Electric Company, North Adams, Mass., a corporation of Massachusetts Application July 18, 1945, Serial No. 605,786

7 Claims. (Cl. 178—44)

This invention relates to new and improved electrical circuits and more particularly refers to artificial transmission lines having characteristics which are highly desirable but heretofore have been practically unattainable.

Transmission lines are of several general types, e. g., two wire, concentric, balanced two wire, four wire, etc. The present invention is concerned with two wire, open-ended transmission lines, that is, a pair of parallel conductors connected into a circuit at only one end. Transmission lines of this type usually possess an input impedance which varies considerably with frequency, maximum impedance values occurring at the frequencies corresponding to multiples of ½ wave lengths. For example, if the open-ended line is being used to shunt high frequency components in a transmission circuit, a high input impedance will be offered to certain ranges of the high frequencies. A further disadvantage is the physical size of transmission lines. While the desirable characteristics thereof might suggest their use in communications circuits, as filters, etc. the physical bulk thereof usually prevents their application in such a manner.

It is an object of this invention to overcome the disadvantages of two wire open-ended transmission lines, such as high input impedance at certain high frequencies. It is a further object to produce novel artificial transmission lines possessing the desirable and useful properties of two wire transmission lines without the bulk usually associated therewith. A further and important object is to produce novel artificial transmission lines having low impedance values over a wide range of frequencies. A still further object is to incorporate the novel transmission lines of the invention into numerous useful electrical circuits. Additional objects will become apparent from a consideration of the following description and claims.

Figure 1:
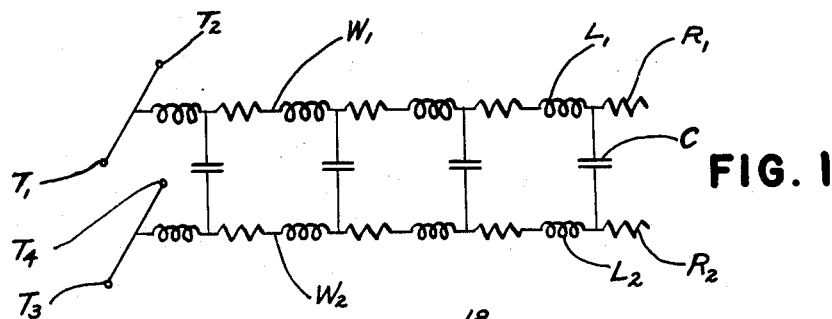
Figure 2:
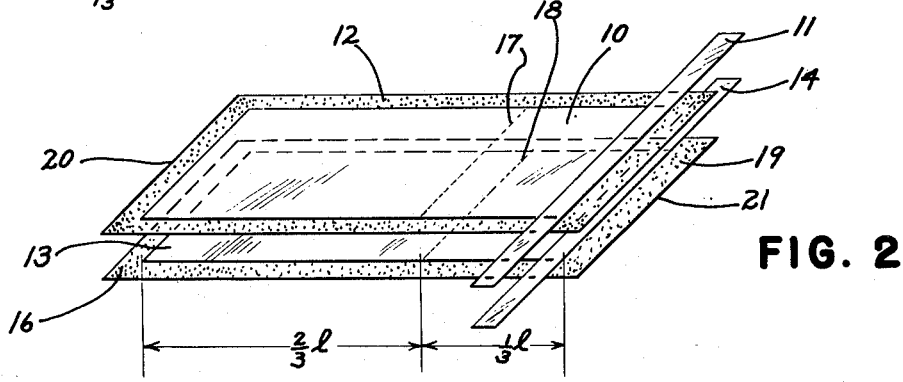
Figure 3:
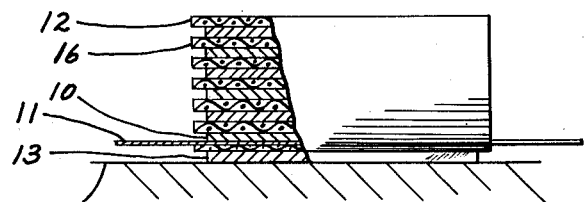
Figure 4:
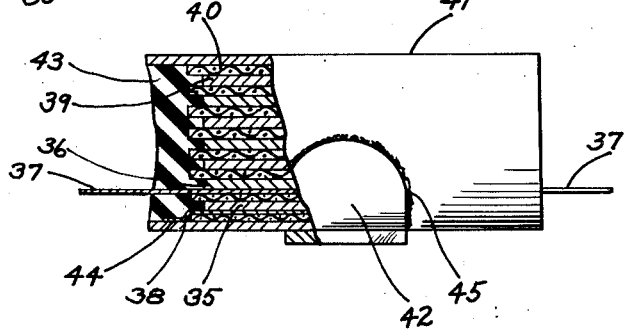

The invention will be discussed with reference to the appended drawings, in which:

Figure 1 shows the schematic electrical appearance of the transmission lines of the invention, Figure 2 shows one of the lines of the invention laid out before winding, Figure 3 shows a partial cross-section of one of the finished lines, produced in accordance with the invention, Figure 4 shows a partial cross-section of another finished transmission line of the invention, and Figures 5 and 6 show the insertion loss versus frequency curves for several transmission lines.

Figure 7 is similar to Fig. 2 but shows a further type of transmission line exemplifying the invention.

Referring more specifically to Figure 1, the schematic electrical appearance of the transmission lines of the invention is shown. The line is composed of two parallel conductors $W_1$ and $W_2$ along which are distributed inductance, $L_1$ and $L_2$, and distributed resistance $R_1$ and $R_2$, respectively. Between the two conductors is distributed capacitance, $C$. This is a conventional way of showing the appearance of a two wire transmission line, of course.

Terminals $T_1$ and $T_2$ are affixed to a point in the conductor $W_1$, and terminals $T_3$ and $T_4$ are affixed to an equivalent point in conductor $W_2$. The reason for employing dual terminals will be discussed in greater detail in later paragraphs.

Figure 2 shows one of the artificial transmission lines of the invention laid out before winding. 10 and 13 are flat electrode foils, separated and insulated by dielectric spacers 12 and 16. At one extremity of electrode foil 10, a terminal tab 11 is positioned. Likewise, a terminal tab 14 is located at the same extremity of foil 13. It will be noted that these tabs extend beyond both sides of the dielectric spacers 12 and 16. For this reason they will be defined as, and later referred to herein as "through-tabs."

The electrode foils and spacers are subsequently helically wound, beginning at either end, 20 or opposite end 21, preferably at 20, of the laid-out section shown. Following helical winding into a convolute form, the line may be pressed flat or into other shapes, if so desired, without appreciably affecting the desirable electrical properties thereof.

An alternate construction involves exposure of the outer turn of the electrode foil located on the outside of the winding, to replace a through-tab on that electrode. This involves removal of an end portion 19 of spacer 16, if foil 13 is the outer conductor. Thus, the foil may be directly connected in an electrical circuit without required through-tab 14.

A further embodiment and alternate construction for the artificial transmission lines of my invention, as shown in Fig. 7, requires that through-tabs 11 and 14 be located at intermediate points in the winding, indicated by dotted lines 17 and 18, respectively. The foils are thus located at a point corresponding approximately to one-third of the length of the electrode foil. The advantage of this particular embodiment will be discussed with reference to Figure 6.

Referring now to Figure 3, a partial cross-section of a finished transmission line is shown. In this figure, 10 and 13 represent electrode foils helically wound and separated by dielectric spacers 12 and 16. Through tab 11 contacts electrode foil 10 at the last turn thereof, while foil 13 directly contacts ground 30, which may be, for example, the chassis of an electronic communications device.

Referring now to Figure 4, a partial cross-section of another type of transmission line is shown. 36 is an aluminum electrode foil to which is welded or stitched through-tab 37. The surface of the electrode foil is formed, that is, an insulating aluminum oxide film is electrolytically formed thereon by placing the foil in an electrolyte solution, such as boric acid or oxalic acid in water, as the anode and passing current through the bath. Electrode foil 35 is also of aluminum and may or may not be "formed" as desired. Through-tab 38 is connected to foil 35. Spacing material 39 and 40 separates the electrode foils. These spacers are generally very porous in nature and are saturated with a very viscous electrolyte, such as the reaction product of ammonium borate and glycerin. A cylindrical metal container 41 circumferentially encloses the wound transmission line. Tab 35 is connected thereto as indicated at 44. The ends of the wound unit are sealed by means of a suitable insulating material 43 such as an asphaltic wax, Bakelite disc, etc. In the case of a wax-like material, the molten wax is poured in the end of the unit and allowed to cool and harden, while in the case of a hard disc, the edges of container 41 are crimped thereabout. Lug 42 is attached by solder 45 to container 41 to provide electrical connection and mounting means therefor. A rivetted metal strap might also be employed. Mounting lug 42 is preferably rather wide and is so disposed that the distance between the can and the mounting position is as small as conveniently possible.

The structural components, dimensions, etc. of the transmission lines of the invention will be discussed in detail following the description of Figures 5 and 6, which illustrate certain of the electrical properties of the transmission lines of the invention as well as properties of prior transmission lines.

Referring now to Figures 5 and 6, insertion loss versus frequency curves for several transmission lines of the two wire open-ended type are shown. The transmission line is placed as a filter in shunt with a load, so as to reduce the unwanted frequencies in the load. Its effectiveness may be measured by noting the ratio of voltage across the load at a particular frequency without and with the transmission line as a shunt, the source of current being maintained constant. This ratio is known as the insertion loss. Thus, if a high value of insertion loss occurs at a certain frequency, the signals of that frequency passing through the load are considerably reduced when the transmission line is in shunt with the load circuit. A high insertion loss, therefore, is desirable when the transmission line is to be employed as a filter element. Curve A is the calculated insertion loss of a lossless transmission line with the characteristic impedance of .1 ohm. Its length is 100" with the separator possessing a dielectric constant of approximately 2.5.

It is well known that when the impedance of a transmission line is at a maximum, the insertion loss is at a minimum, and, likewise, when the impedance is at a minimum, the insertion loss is at a maximum. The relationship is inverse.

It will be noted that the insertion loss maximums are reached at about 18.4, 55.2 and 92 megacycles, corresponding to $1/4$, $3/4$, and $5/4$ of the wave length of the line, respectively. Minimum insertion loss values occur at about 36.8 and 73.6 megacycles, corresponding to $2/4$ and $4/4$ of the wave length of the line. At the maximum insertion loss points, the input impedance is, of course, negligible, while at the minimum insertion loss peaks, the input impedance approaches infinity.

Curve B shows the characteristics of a two wire transmission line, in which losses occur due to the resistance of the conductors, imperfections in the dielectric separating the conductors, etc. The line is 100" long and possesses a characteristic impedance of approximately .1 ohm. The insertion loss-frequency curve is similar to that of the theoretical line with the exception that the maximum and minimum points are rounded off. The maximum and minimum points become progressively lower and higher, respectively, as the frequency increases, approaching the insertion loss corresponding to that with an impedance of $Z_0$, the characteristic impedance of the line.

Referring now to Figure 6, the curves for insertion loss versus frequency of two of the artificial transmission lines of the invention are given. Curve C represents the curve of one of the lines of the invention, possessing an electrode foil length of 100", the electrode foils being made of copper, the dielectric being polystyrene and $Z_0$ being slightly greater than .1 ohm. The maximum insertion loss points occur at 9.2, 27.5 and 46 megacycles, etc. and are not pronounced. The minimum points occur at 18.4 and 37 megacycles, etc. and are sharply defined, as indicated at $f$ and $g$, similar to the minimum points of curve A, although the value of insertion loss is of greater magnitude. Curve D represents the characteristics of an approximately .1 ohm lossy artificial transmission line having electrode foils of thin aluminum sheets possessing a resistance of about .006 ohm per inch of line length and a dielectric spacer of oil-impregnated paper, both the electrodes and dielectric having higher losses than in the case of the line described in connection with curve C. Curve D is similar to curve C, but the minimum points are not sharply defined, and the maximum and minimum points rapidly approach a constant level of insertion loss. The maximum and minimum impedance values approach each other in value as the frequency increases, resulting in a substantially constant value of insertion loss. Further I have found that corresponding maximum and minimum impedance values and insertion loss values in my novel lines occur at frequencies equal to $1/2$ those of normal transmission lines of the same physical length of conductors. While it forms no part of the present invention, it thus appears that a device which will roll or unroll my novel transmission line will be able to match a range of impedances, to "tune" to a frequency and the like.

When lines of this type are constructed with low loss dielectrics such as polystyrene, and thin conductors such as .00017 inch thick aluminum, the input impedance at frequencies of half wave resonance is higher than at first expected.

In a rolled line the actual current flow is reduced materially at frequencies of half-wave resonance, thus lowering the voltage drop due to resistance of the conductors.

As a result, the ratio of maximum to minimum impedance in a helically rolled line is much greater than in a similar line of the same electrical length laid out flat.

Greater insertion loss can be achieved by directing the electrical path of direct currents, or low frequency signals not to be filtered out by the transmission line longitudinally along the electrodes. According to this construction, single terminal tabs would be inserted at opposite ends of the individual electrode foil, and the transmission line connected in the circuit so that the direct current will pass along the electrode foil.

A compact filter of the so-called "pi" type can be made simply by winding only one electrode foil during the center of the winding and making connections for direct current on the continuous foil at points opposite start and finish of individual or single windings. The single windings are, of course, helical coils.

In accordance with my invention, I am able to produce artificial transmission lines possessing the characteristics of long, open-circuited, low impedance transmission lines, that is, low input impedance over a wide range of high frequencies and a very high input impedance to direct current and low frequency alternating currents. Further, I am able to produce novel artificial transmission lines which possess extremely low characteristic impedance values and at the same time, are sufficiently lossy to substantially prevent formation of standing waves therein. My novel transmission lines possess the additional advantages of small volume, simplicity of construction, durability, and other related factors important in industrial applications.

According to one of the preferred embodiments of the invention, my artificial transmission lines are produced with substantially negligible external series impedance by use of through-tab terminals attached at corresponding points to the two electrode foils forming the transmission line.

According to another preferred embodiment of the invention, standing waves and sharp resonance points are effectively damped out by proper selection of resistance values for the electrode foils, dielectric properties of the dielectric spacing material between the electrode foils, and the physical length, width and thickness of the electrode foils.

According to another preferred embodiment of the invention, I am able to cancel the maximum and minimum points of insertion loss occurring in my artificial line by inserting terminating through-tabs on the electrode foils at a point equal to one-third of the length of the electrode foils. In doing this, I am able to obtain in a unitary structure the electrical equivalent of two open-ended two wire transmission lines connected in parallel, one of which has an effective length equal to twice that of the other transmission line and therefore while one has maximum insertion loss, the other has a coincident minimum insertion loss.

Referring again to Figures 1, 2, 3 and 4, further discussion of the various embodiments of my invention will be made. By novel terminal construction, that is, the use of through-tab terminals, I obtain a negligible external series impedance, so that the input impedance of my transmission line proper will not be substantially increased by external impedances, the latter performing no useful function. I therefore employ through-tab terminals such as $T_1$ and $T_2$, and $T_3$ and $T_4$ of Figure 1 for connecting the line into outside electrical circuits. With reference to Figures 2 and 3, through tab 11 would have electrical connections made at each end thereof so that the direct current would pass across the convolutely wound line. While my other terminating device for electrode foil 13 of Figure 2 may be a through-tab such as 14, for many electrical circuit applications, it is both physically simpler and electrically as satisfactory to expose a portion of the outer turn of the outside foil for direct connection to ground or whatever other part of the circuit to which connection is to be made. Alternatively, the exposed outside foil may be connected to a metal container such as 41 in Figure 4 which in turn is connected to a terminal mounting lug 42. It is generally preferable to expose only a small portion of the outer turn of the outside electrode foil, for insulation purposes, but it is also preferable that the exposed portion shall be rather wide for optimum electrical performance.

In order that the standing waves be substantially dissipated, I prefer to use structural components which will contribute to their dissipation. For example, I have obtained outstanding results by employing as electrode foils thin sheets of rolled aluminum approximately .00025" thick and 1" wide. This foil has a resistance of approximately .006 ohm per inch. Other foils such as lead, tin and related materials may also be employed. While copper foil is useful the results obtained therewith are not as satisfactory, that is, the damping of standing waves is less pronounced. For certain applications, however, low resistance materials, such as copper, are desirable.

As dielectric spacing material, I prefer to use materials such as impregnated kraft or linen paper, cellulose acetate, cellulose nitrate, polyvinyl ethers, regenerated cellulose, polyvinyl chloride, etc. Since these materials have appreciable high frequency electrical losses relative to air, the damping effect for any one length of foil is quite pronounced. In this connection, it may be mentioned that metallized paper, or metallized resin film may be employed in place of separate electrode foils and spacers. Where the damping effect is not to be pronounced, polystyrene and polyethylene films are suitable dielectrics.

Inasmuch as the input impedance of the transmission line is inversely proportional to the insertion loss it will be appreciated that a low impedance is desirable. Since the characteristic impedance is approximately equal to the $$\sqrt{\frac{L}{C}}$$

it is apparent that it is desirable to employ relatively wide foil where a high value of insertion loss is needed. For any length of electrode foil the capacity is directly proportional to the width of the foil while the inductance is roughly inversely proportional to the width of the foil.

In general, my transmission lines comprise a pair of electrode foils separated by dielectric spacers and convolutely wound, through-tab terminals being provided for each electrode at similar points in the winding and extending from both sides thereof. According to one of the preferred embodiments of the invention it has been shown that my artificial transmission line comprises a pair of electrode foils separated by dielectric spacing material and helically wound, through terminal tabs being affixed to each of said foils at a point located one third of the length of the electrode foils and extending from both sides of the winding. In accordance with another of the limited embodiments of my invention I have produced an artificial transmission line comprising two convolutely wound electrode foils separated by dielectric spacing material, the inner of said electrode foils being provided with a through-tab terminal extending from both sides of the winding, a portion of the outside turn of the outer foil being exposed for electrical contact in place of a through-tab or a single tab.

When I employ wide aluminum conductors, e. g. from about 1″ wide to about 4″ wide, separated by a dielectric material .0006″ to about .002″ thick having an effective dielectric constant in the range of 2 to 6, the characteristic impedance is in the range of about .1 ohm. A line of this impedance, when shunting a 10 ohm load circuit level, will give an insertion loss of about 40 decibels over a wide range of high frequencies, at least to about 300 megacycles.

With the electrolytic type of network described in connection with Figure 4, it is possible to employ much shorter lines, that is, the length of electrode foil may be reduced from the length required in a similar electrostatic transmission line such as described in connection with Figure 3. That may be attributed to the fact that there are higher inherent losses. I am able to produce transmission lines having a characteristic impedance of about .3 ohm at frequencies above .1 megacycle to about 50 megacycles. For frequencies in the range of about .1 to 50 megacycles, I prefer to produce electrolytic type transmission lines with an electrode foil length of at least 10″ and preferably 25″ or greater. With the electrostatic type of artificial transmission line described in connection with Figures 2 and 3 I prefer to employ electrode foil lengths of at least 50″ and preferably 100″, when considering frequencies between about 1 and 100 megacycles. As previously mentioned the actual length of my transmission line depends upon the characteristics desired in the finished element, that is, for effective low frequency damping, longer electrode foil lengths may be employed; with high frequencies, shorter lengths of electrodes are used. However, the resistance of the electrode foil per unit length and the dielectric properties of the spacing material may be varied to accomplish the same purpose or to supplement the increased damping obtained by increasing the length of the line.

The various structures shown in Figures 2, 3 and 4 are useful for either the electrostatic or electrolytic type of networks, that is, for example, an electrostatic line may be encased in a metal container such as that shown in Figure 4. Numerous structural arrangements will be apparent to those skilled in the art.

The transmission lines of the invention are useful as circuit elements in numerous applications due to their outstanding frequency characteristics, their small volume, and the flexibility of construction and termination. Among the numerous uses might be included application as filter elements such as three and four terminal networks for the purpose of filtering out high frequencies. As a three terminal network, the terminals would be at each end of one through-tab such as 11 of Figure 3 and a single terminal such as 13 of Figure 3. In the case of a four terminal transmission line, terminal connections would be made to both extremities of each through-tab such as 10 and 14 of Figure 2.

It is readily apparent that numerous modifications of my artificial transmission line will occur to those skilled in the art. While the lines described herein are generally employed openended, they also may be used short circuited at one end for special applications.

I have disclosed that the through-tabs should be positioned at similar or corresponding points in the transmission line. By this I mean that the terminal tabs to opposite sides of the line should be located at equivalent positions along the line. In the case of a helically wound transmission line, the ideal terminating arrangement is obtained by having the through tabs located on a radial extremity of the helically wound unit, positioned at exactly physically duplicate points in each line conductor. For practical purposes, however, I prefer to position the terminals at points along the line not greater than one inch from each other, that is, one terminal tab may be located preferably not more than one inch from the ideal position corresponding to the terminal tab connected to the other line conductor. In the case of smaller helically wound transmission lines, I prefer to have the terminal tabs located not more than one-half turn (of the winding) or 180° apart from the ideal position, while in larger lines, it should be not greater than one-quarter turn or 90° for optimum results.

In the case of the transmission lines in which a portion of or extremity of the outer turn of the outside electrode foil is exposed for electrical connection, the through-tab should be located at or near the outer extremity of the inside electrode foil, the relation mentioned above being maintained.

As many apparently widely different embodiments of this invention may be made without departing from the spirit and scope hereof, it is to be understood that the invention is not limited to the specific embodiments described herein, except as defined in the appended claims.

I claim:

1. An artificial transmission line comprising a pair of elongated flat electrodes separated by dielectric material and convolutely wound, separate terminals attached to the respective electrodes at substantially the same longitudinal point in the winding, at least one of said terminals extending from both side edges thereof.

2. An artificial transmission line comprising a pair of elongated aluminum foil electrodes separated by a porous dielectric spacer impregnated with a dielectric material and convolutely wound, separate terminals attached to said respective electrodes at substantially the same longitudinal point in the winding, at least one of said terminals extending from both side edges thereof.

3. An artificial transmission line comprising a pair of elongated aluminum foil electrodes at least one of which has formed thereon a layer of aluminum oxide, said electrodes being separated by a porous spacer saturated with a viscous electrolyte and convolutely wound, separate terminals attached to said respective electrodes at substantially the same longitudinal point in the winding, at least one of said terminals extending from both side edges thereof.

4. An artificial transmission line comprising a pair of flat elongated electrodes separated by a dielectric material and convolutely wound, separate terminals attached to said respective electrodes at substantially the same longitudinal point in the winding, each of said terminals extending from both side edges thereof.

5. An artificial transmission line comprising a pair of flat elongated electrodes separated by a dielectric material and convolutely wound to provide respective outer electrode ends one of which is exposed and the other of which is covered, a first terminal attached to the covered electrode end and extending from both side edges of the winding, and the other of said terminals being a housing for the transmission line and contacting the outer exposed electrode edge.

6. An artificial transmission line for connection in a circuit to present a low shunting impedance to undesired alternating electric signals of a specific frequency, said line comprising a pair of correspondingly elongated flat electrodes separated by a dielectric material and convolutely wound, separate terminals attached to the respective electrodes at substantially the same longitudinal point in the winding, said point being spaced from one longitudinal end of the winding by a distance corresponding electrically to an odd whole number multiple of one-fourth the wave length of said undesired signals to present a low impedance to such undesired signals appearing to said terminals, at least one of said terminals extending from both side edges of the winding.

7. In an artificial transmission line, a pair of corresponding elongated electrode strata separated by and convolutely wound with dielectric material, a pair of separate terminals attached to the respective electrodes at substantially the same longitudinal point of the winding, one-third of the longitudinal distance from one end, at least one of the terminals extending beyond both side edges of the winding.

NELSON E. BEVERLY.

REFERENCES CITED

The following references are of record in the file of this patent:

UNITED STATES PATENTS

| Number | Name | Date |
| --- | --- | --- |
| 2,027,067 | Schubert | Jan. 7, 1936 |
| 2,218,162 | Brock | Oct. 15, 1940 |
| 2,270,169 | Muller | Jan. 13, 1942 |
| 2,355,788 | Dunleavey | Aug. 15, 1944 |